F. E. WATTS.
WIND SHIELD CONSTRUCTION.
APPLICATION FILED MAY 13, 1918.

1,311,582.

Patented July 29, 1919.

Inventor
Frank E. Watts
By Whittemore, Hulbert, & Whittemore
Attorneys

UNITED STATES PATENT OFFICE.

FRANK E. WATTS, OF DETROIT, MICHIGAN, ASSIGNOR TO HUPP MOTOR CAR CORPORATION, OF RICHMOND, VIRGINIA, A CORPORATION OF VIRGINIA.

WIND-SHIELD CONSTRUCTION.

1,311,582.    Specification of Letters Patent.    Patented July 29, 1919.

Application filed May 13, 1918. Serial No. 234,272.

*To all whom it may concern:*

Be it known that I, FRANK E. WATTS, a citizen of the United States of America, residing at Detroit, in the county of Wayne and State of Michigan, have invented certain new and useful Improvements in Wind-Shield Constructions, of which the following is a specification, reference being had therein to the accompanying drawings.

This invention relates to windshield constructions and particularly relates to windshields having upper and lower glasses which are adapted to slightly overlap at their juncture.

It is the object of the invention to mount a flexible closing strip upon the overlapping edge portion of one of the glasses to engage the other glass and produce a tight closure that will substantially prohibit any passage of moisture or air currents.

Figure 1:
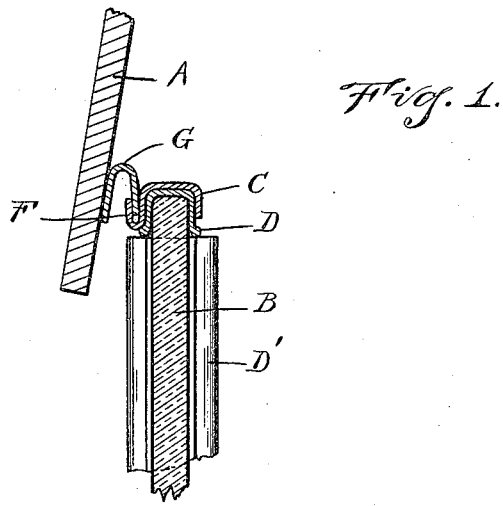
Figure 1 is a transverse vertical sectional view of the overlapping portions of the two windshield glasses showing the lower glass equipped with applicant's improved weather-strip.
Figure 2:
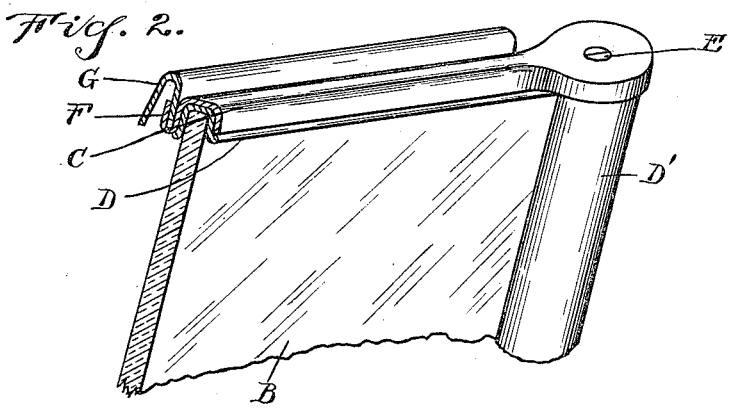
Fig. 2 is a fragmentary perspective view showing a corner portion of the glass which carries the weather-strip, showing particularly the engagement of the weather-strip retaining means with the sash of the glass.

In these views the reference characters A and B respectively designate upper and lower windshield glasses which are adapted to slightly overlap, as is clearly shown in Fig. 1. Upon the upper edge of the glass B there is mounted a channel strip C, between which and the glass there is engaged the usual cushion lining D of fabric or metal, forming a snug joint between said channel and glass. The channel strip C has enlarged circular end portions fitting over the sash members D', and having screws E passed therethrough and into said sash members to hold the channel strip in place. At the side of the channel strip C, which is approached by the glass A, said strip is returnbent to form an upwardly opening channel F constituting a keeper or retainer for an elastic rubber strip G of an inverted channel shape, to which shape said strip is preferably molded. The rubber strip G serves as a yieldable stop to cushion the movement of the glass A as it approaches the glass B, and further functions to snugly close the opening between the two glasses when the same are in proximity to prevent moisture or air currents passing therebetween.

What I claim as my invention is:—

1. A windshield construction, comprising a pair of glasses having edge portions adapted to overlap in one position thereof, a channel shaped strip fitted over one of said overlapping edge portions, said strip being formed at one side thereof with a channel shaped retainer, and a channel shaped yieldable strip having one edge portion engaged in said retainer, said strip forming a cushion to absorb the impact shock of the glasses and constituting a closure for the opening between the same when they are in overlapped relation.

2. A windshield construction, comprising a pair of glasses having edge portions adapted to overlap in one position thereof, sash members engaging the sides of one of said glasses, a channel-shaped strip fitted over the overlapped edge of said glasses and having semi-circular end portions fitting over said sash members, and a yieldable strip carried by said channel member at the side thereof approached by the other glass, said strip projecting laterally to cushion impact of the two glasses and forming a closure for the opening between the glasses when the same are in overlapping relation.

In testimony whereof I affix my signature.

FRANK E. WATTS.

Copies of this patent may be obtained for five cents each, by addressing the "Commissioner of Patents, Washington, D. C."